(12) United States Patent
Zhu (10) Patent No.: US 9,441,535 B2
(45) Date of Patent: Sep. 13, 2016

(54) ROTARY INTERNAL COMBUSTION ENGINE

(71) Applicant: Qin Hao Zhu, Ningbo (CN)

(72) Inventor: Qin Hao Zhu, Ningbo (CN)

( * ) Notice: Subject to any disclaimer, the term of this patent is extended or adjusted under 35 U.S.C. 154(b) by 143 days.

(21) Appl. No.: 14/464,295

(22) Filed: Aug. 20, 2014

(65) Prior Publication Data

US 2015/0053170 A1    Feb. 26, 2015

(30) Foreign Application Priority Data

Aug. 23, 2013   (TW) .............................. 102130221 A (51) Int. Cl.
| | |
|---|---|
| *F02B 53/00* | (2006.01) |
| *F02B 53/02* | (2006.01) |
| *F01C 1/063* | (2006.01) |
| *F01C 21/00* | (2006.01) |

(52) U.S. Cl.
CPC .............. *F02B 53/02* (2013.01); *F01C 1/063* (2013.01); *F01C 21/008* (2013.01); *Y02T 10/17* (2013.01)

(58) Field of Classification Search
CPC ...... F02B 53/02; F01C 21/008; F01C 1/063; F01C 1/077; Y02T 10/17
USPC ..... 123/43 B, 18 A, 18 R, 43 A, 43 R, 45 A, 123/200–249; 418/33–34
See application file for complete search history.

(56) References Cited

U.S. PATENT DOCUMENTS

| | | | | |
|---|---|---|---|---|
| 4,683,852 A | * | 8/1987 | Kypreos-Pantazis . | F01C 1/3566 123/228 |
| 5,645,027 A | * | 7/1997 | Esmailzadeh ........... | F01C 1/077 123/245 |
| 6,247,444 B1 | * | 6/2001 | Parks ...................... | F01C 1/063 123/245 |

* cited by examiner

*Primary Examiner* — Nicholas J Weiss
*Assistant Examiner* — Jason T Newton
(74) *Attorney, Agent, or Firm* — Bacon & Thomas, PLLC (57) ABSTRACT

This invention is to provide a rotary internal combustion engine, which comprises a stationary cylinder connected with a shell, a plurality of piston claw clamps being movably provided on said stationary cylinder, a rotatable power output shaft pivotally provided on said shell, and an arc plate being fixed on said power output shaft within said shell, and a plurality of piston claw clamps being movably provided on a movable cylinder; wherein three pistons are rotating circumferentially in said movable cylinder and are clamped and released in turn cyclically by said piston claw clamps upon running, respectively, so as to switch working modes sequentially; and a plurality of spring cups are provided outside of said movable cylinder and each has a spring with a push rod provided therein such that said piston claw clamps can be controlled by said arc plate through said spring cups and said push rods.

5 Claims, 6 Drawing Sheets

ROTARY INTERNAL COMBUSTION ENGINE

FIELD OF THE INVENTION

This invention relates to an internal combustion engine, more particularly to a rotary internal combustion engine having three pistons rotating circumferentially in a movable cylinder thereof and being clamped and released in turn cyclically by a plurality of piston claw clamps upon running, respectively, so as to switch working modes sequentially.

BACKGROUND OF THE INVENTION

Nowadays, among the contemporary rotary internal combustion engines of prime mover, the reciprocating four stroke cycle engine generally stands as the most prominent one and is applied commonly. Wankel rotary engine is adopted also though seldom used. In spite of a lot of advantages found in the rotary engine, i.e. compactness, lightweight, stability in operation, simplicity in structure and uniform torque resulting in less noise in running, high reliability and long durability, it has the drawbacks, such as great volume rate of the combustion chamber, great oil consumption, high HC exhaust, and inferiority in low speed performance. Therefore, not spark ignition but compression ignition type alone is allowable. More drawbacks are further found in the incompatibility for the diesel oil, exacting requirement in machining technique, the high cost and the difficulty in maintenance.

The complicacy of the distribution mechanism and the high precision requirement of the crank shaft connecting rod of reciprocating four stroke cycle engine attribute to the robustness and heaviness thereof. The linear movement of the piston rod consumes a substantial portion of power and will bring about vibration and noise. The continuous angle variation of the power output of the crank shaft connecting rod causes the torque to be unevenly applied wherein the greatest angle of the torque is less than 80°. The power output is the greatest when the cylinder begins to combust. The angle of the crank shaft connecting rod during power output is smaller with the result that the power is consumed and a strong vibration is produced. Accordingly, a great noise is made and the reliability and durability are substantially reduced during the movement of high intensity.

To obviate the above defects of the conventional engine, the inventor of this invention has ever proposed a rotary internal combustion engine. The above rotary internal combustion engine the inventor devised is capable of improving a lot of problems of the conventional engine. In comparison with the conventional engine, it not only has the advantages of both the rotary internal combustion engine and the reciprocating four progress cycle engine, but also overcomes a lot of defects of the conventional internal combustion engine and has some advantages.

Though the above rotary internal combustion engine, the inventor developed and designed obviates indeed a lot of drawbacks of the conventional internal combustion engine and substantially improves the efficiency of the internal combustion engine in many ways and the production cost thereof, the inventor still insatiably invests his efforts in the R&D and carefully observes the above rotary internal combustion engine with a hope to further devise a better rotary internal combustion engine on such an extraordinary basis. The inventor availed his persistent efforts to have finally found that the express gate provided in the above rotary internal combustion engine would limit the rotation speed of the rotary internal combustion engine, causing the latter easily damageable. Additionally, the piston of the rotary internal combustion engine will hit the express gate to cause the mechanical damage of the rotary internal combustion engine when the circuit thereof fails as a result of which the solenoid valve provided in the above rotary internal combustion engine doesn't work. Accordingly, the inventor in a spirit of "excelsior" keeps on the R&D in this respect to look forward to thoroughly improving the design of the rotary internal combustion engine.

BRIEF SUMMARY OF THE INVENTION

In view of the above several drawbacks of the conventional internal combustion engine, the inventor made efforts to get deep into the above problems and devised a rotary internal combustion engine excellent in performance to enable the obviation of several drawbacks of the conventional internal combustion engine. However, the inventor deems that there is still room for the above rotary internal combustion engine to be further improved. The inventor based on his yearly experience in the R&D of relevant techniques, kept on trying to solve the problems found, and thus far and eventually developed and designed the rotary internal combustion engine of the present invention.

One object of this invention is to present a rotary internal combustion engine comprising a shell fixed on a hydraulic cylinder; a gas cylinder having a movable cylinder and a stationary cylinder connected with said shell, a spring cup, an arc plate seat of the movable cylinder, an intake hose, an exhaust hose, a combustion chamber, a spark plug, a spray chamber, a spray plug and an isolation area being provided on said stationary cylinder and a plurality of piston claw clamps being further movably provided thereon; and a rotatable power output shaft provided on the bearing of said shell, a movable cylinder and two auxiliary wheels being axially fixed on said power output shaft, a plurality of piston claw clamps being movably provided on said movable cylinder, the stationary cylinder and the movable cylinder being jointly formed the gas cylinder, the inwardly concave semicircle inside of said stationary cylinder and the inwardly concave semicircle outside of said movable cylinder being jointly formed a circular chamber inside the gas cylinder, said movable cylinder and said arc plate being provided within said shell. Said rotary internal combustion engine further comprises: three pistons rotating circumferentially in said gas cylinder, respectively clamped and released in turn cyclically by said piston claw clamps in said gas cylinder upon running, and furthermore switching working modes on and on; and a plurality of spring cups provided outside of said movable cylinder, in each of said spring cups a spring having a push rod therein being respectively provided such that said piston claw clamps can be controlled by said auxiliary wheel and said arc plate on said arc plate seat of said movable cylinder through said spring cups and said push rods.

Furthermore, the present invention is a rotary internal combustion engine in which multiple pistons are provided in an elliptical ring cavity and the pistons cooperate with one another to whirl in turns to switch working modes. The rotary internal combustion engine is made up of a gas cylinder, a shell, a hydraulic cylinder, pistons, auxiliary wheels, a power output shaft, piston claw clamps, a spray plug, a spark plug and spring cups. The gas cylinder is a hollow elliptical ring cavity made up of two semi elliptical rings, one concave outward, and the other concave inward. The semi elliptical ring concave inward is an external cylinder, while the semi elliptical ring concave outward is an internal cylinder. The semi elliptical ring concave outward is inserted into the semi elliptical ring concave inward. The semi elliptical ring concave outward and the semi elliptical ring concave inward combines into an elliptical ring cavity as a gas cylinder. In case that the internal cylinder outputs power, the internal cylinder is referred as a movable cylinder, while the external cylinder is referred as a stationary cylinder. In case that the external cylinder outputs power, the external cylinder is referred as a movable cylinder, while the internal cylinder is referred as a stationary cylinder.

The rotary internal combustion engine of this invention presents a rotary internal combustion prime motive power machine having a gas cylinder body with a novel elliptical ring cavity. It has the following advantages: compactness, lightweight, not strict requirement of material, low requirement of processing technique, absence of complicate intake and exhaust system, easiness to design and assemble, convenience in adjustment and test, high efficiency in power output, economical oil consumption, noiselessness and smoothness in running, absence of backfire and knock frequently found in the internal combustion engine, substantial reduction of pollution of the exhausted gas to the atmosphere, the power and the torque angle of the rotary internal combustion engine being great and invariable and the torque being uniform and highly efficient.

The conversion rate of this invention from the heat energy of the internal combustion engine into the mechanical energy is high, so as to reduce the heat loss and the heat discharge into the atmosphere. This internal combustion engine makes one revolution which equals to two revolutions of the reciprocating four stroke cycle engine to complete gas charging progress, compression progress, combustion progress and exhaustion progress. The time the combustible gas mixture takes to stagnate in the gas cylinder is longer one time more than the reciprocating four stroke cycle engine. The time of the cylinder progress, in which the combustible gas mixture utilizes the remaining heat in preheating, combusting and exhausting, is longer than that in gas charging and compressing as a result of which the combustion is full. The cylinder progress of working exhaustion may be adjusted in designing relative to that of the gas charging compression according to actual and different fuel need.

The internal combustion engine of this invention is unobstructed, stable and full and has continuity in exhaustion. It is little in noise, low in the temperature of the exhausted waste gas, absent of sparkle plug and highly safe in environment. Without the provision of crank and connecting rod, flying wheel and gas distribution mechanism, the rotary internal combustion engine greatly reduces the components, lighten the weight, and reduces its own mechanical consuming energy.

The piston of the internal combustion cylinder of this invention directly applies its mechanical energy on the power output shaft to enhance the power of the internal combustion cylinder and thus avoids unnecessary power loss. Meanwhile, the reacting force to start the internal combustion cylinder is great to facilitate the starting. The specific variations of the rotary internal combustion engine are great in number such that it may be designed according to actual usage situations. In terms of power outputting ways, there are internal cylinder output and external cylinder output. In terms of cylinder amount, there are single cylinder and multiple cylinders. And, in terms of times of explosion and combustion, there are single cylinder single explosion and single cylinder multiple explosions. As to the synthetic mode, there are multiple cylinders single explosion and multiple cylinders multiple explosions wherein the latter is the optimum.

The present invention hereinafter described is a typical rotary internal combustion cylinder of single cylinder single explosion with an internal cylinder to output power. The stationary cylinder is fixed on the shell and the hydraulic cylinder, wherein the shell is fixed on the hydraulic cylinder.

On the stationary cylinder, there are provided with an intake port, an exhaust port, an explosion chamber, a spark plug, a spray chamber, a spray plug, three pairs of movable piston claw clamps (i.e. a pair of compression movable clamps, a pair of working movable clamps and a pair of isolation movable clamps). A spring cup and a movable push rod are mounted on the rear portion of the piston claw clamp. A convex arc plate seat is provided between the compression fixed clamp and the working fixed clamp inside of the outer edge on both sides of the stationary cylinder. The convex arc plate seat is provided in the shell.

Another object of the present invention is to present a configuration, wherein the convex arc plate seat of the movable cylinder is provided at the position where the exterior of the stationary cylinder connects with the movable cylinder. Three convex arc plates of the movable cylinder are provided above a portion inside of the convex arc plate seat of the movable cylinder corresponding to the push rod of spring cup.

Still another object of the present invention is to present a configuration, wherein the auxiliary wheel and the arc plate on the convex arc plate seat of the movable cylinder are respectively provided with a beforehand falling arc plate.

Still another object of the present invention is to present a configuration in which the intake port on the stationary cylinder is provided between the air charging compression cylinder section and the isolation area. A check valve is provided in the intake port to prevent the combustible gas mixture inside the gas cylinder from escaping out of the gas cylinder due to expansion under the heat of the gas cylinder. Therefore, the intake port opens usually for the intake of gas and closes usually to avoid the exhaustion of gas. For the purpose that when the piston passes by the intake port, the piston ring and the oil ring will not stagnate on the intake port, the intake port on the gas cylinder face of the stationary cylinder has a longitudinal accurate stripe having the same curvature as the gas cylinder for the piston to pass by the intake port smoothly.

A movable cylinder provided in the shell is mounted on the inner side of the stationary cylinder and fixed on the power output shaft through a conjoined body of the movable cylinder. On the movable cylinder there are provided with three pairs of movable piston claw clamps (i.e. a pair of working movable clamps, a pair of compression movable clamps and a pair of shift piston movable clamps). A movable power output shaft provided in the shell is mounted with its two ends on an axle seat on both sides of the shell. A bearing is provided in the axle seat and one end of the power output shaft connects with power outputting machines. Two auxiliary wheels are provided in the shell and fixed on the power output shaft at positions adjacent to two opposite sides of the gas cylinder, respectively. The auxiliary wheel faces the convex accurate working fixed arc plate, the compression fixed arc plate and the isolation fixed arc plate on one side of the gas cylinder. On the back of the piston claw clamp outside of the gas cylinder there is a spring cup to control the piston claw clamp. And in the spring seat there is provided with a spring for pushing or pulling the push rod to control the piston claw clamp.

Still another object of the present invention is to present a configuration, wherein the datum line of the rotary internal combustion engine lies on a line between the central point of the circumference of the movable cylinder and the central point of a working movable clamp, and a line from the central point of the circumference of the auxiliary wheel to the clamping and releasing dead points of an arc plate of working fixed clamp and the clamping and releasing dead points of the arc plate of isolation fixed clamp.

There are five progresses in the process of the rotary internal combustion engine: a working exhaustion progress, an isolation area piston conversion progress, a piston shift progress, an air charging compression progress and a no load progress of the movable cylinder. For full appreciation and convenience of description, three pistons are respectively defined as piston A, piston B and piston C.

Hereinafter, a description will be given about the running status of the rotary internal combustion engine of this invention. In case that under the running inertia of the rotary internal combustion engine, the movable cylinder, the power output shaft and the auxiliary wheel run synchronously together, the no load progress of the movable cylinder is completed and the process advances into the working exhaustion progress. The working movable clamp has clamped piston A and the compression fixed clamp has clamped piston C still. The combustible gas mixture inside the cylinder section sealed by piston A and piston C has been compressed. Piston B is clamped still by the isolation area fixed clamp and fixed in the isolation area while the cylinder section sealed by piston C and piston A is filled with the combustible gas mixture.

When the no load progress of the movable cylinder is completed and the working movable clamp in the movable cylinder clamps the working fixed piston—piston A, the ignition spark ignites the compressed combustible gas mixture to explode and then drives piston A to run. Piston A is converted from a working fixed piston into a working movable piston. Piston A drives the movable cylinder, the power output shaft and the auxiliary wheel to run synchronously together through the working movable piston, and at the same time the waste gas is exhausted from the exhaust port through the exhaust host. The rotary internal combustion engine proceeds forward to the working exhaustion progress. After piston A passes by the spray chamber, the spray plug spray a mist which evaporates under the high heat in the gas cylinder. The vapor expansion enhances piston A's running and lower the temperature inside the gas cylinder. When piston A runs up to the exhaust port, the compression movable clamp ahead of working movable clamp in the movable cylinder has approached to the piston claw clamp slot of the isolation piston—piston B. The shift piston movable clamp approaches to the compression fixed piston—piston C and the push rod of compression movable clamp has entered the beforehand falling arc plate of compression movable clamp. The compression movable clamp has gotten close to piston B to run and is ready to fall to clamp piston B. When the compression movable clamp runs up to the piston claw clamp slot of piston B, the isolation fixed clamp on the isolation area of the stationary cylinder under the control of the arc plate of isolation fixed clamp on the auxiliary wheel releases the isolation piston—piston B to retract into the wall of the stationary cylinder. At the same time, the compression movable clamp under the control of the arc plate of compression movable clamp falls to clamp the isolation piston—piston B such that the exhaustion ends, piston B is converted into the compression movable piston and the piston conversion progress of isolation area starts.

The rotary internal combustion engine under the effect of the expansion force keeps on running and drives piston B to operate. And then, piston B seals off the intake port to proceed an initial compression on the combustible gas mixture in the gas cylinder section between piston C and piston B. When piston A turns to the exhaust port to fully close the same, the push rod of shift piston movable clamp in the movable cylinder enters the beforehand falling arc plate of shift piston movable clamp such that the shift piston movable clamp clings to piston C. Piston A crosses the exhaust port to expose it on the rear portion. The working exhaustion progress completely ends and at the same time, the rotary internal combustion engine starts to run under the inertia of the movable clamp and the auxiliary wheel, and the waste gas still expanding is exhausted outside of the exhaust port. The piston conversion progress of the isolation area still goes on.

At this moment, the shift piston movable clamp runs up to the claw clamp slot of piston C, and the push rod of compression fixed clamp in the stationary cylinder under the control of the arc plate of compression fixed clamp picks up the compression fixed clamp from the claw clamp slot of piston C to restore it into the wall of the stationary cylinder. At the same time, under the control of the arc plate of shift piston movable clamp, the push rod of shift piston movable clamp presses the shift piston movable clamp into the claw clamp slot of piston C. Piston C is converted from the compression fixed piston into the shift piston movable clamp and the piston shift progress starts. Piston C moved by the shift piston movable clamp runs synchronously together with the movable cylinder, the auxiliary wheel and the power output shaft. The push rod of isolation fixed clamp falls into the beforehand falling arc plate of isolation fixed clamp. The isolation fixed clamp clings to piston A which is running to approach to the claw clamp slot of piston A. At this moment, in the rotary internal combustion engine, three pistons moved by the movable cylinder claw clamp to run synchronously together with the movable cylinder, the auxiliary wheel and the power output shaft. The waste gas in the cylinder section of piston C and the exhaust port is pushed by piston C to be initially exhausted. The initial compression of the combustible gas mixture in the gas cylinder section between piston C and piston B stops. And the engine runs and shifts to the cylinder section of combustion chamber.

Along with the running of the rotary internal combustion engine, the exhaust port at the rear portion of piston A opens greater. An intake port is exposed between piston A and piston B and the rotary internal combustion engine begins to fill the combustible gas mixture from the intake port into the gas cylinder section between piston A and piston B. When piston A runs to the middle portion of the isolation area, the push rod of working movable clamp on the movable cylinder under the control of the arc plate of working movable clamp picks up the working movable clamp to withdraw into the wall of the movable cylinder and releases piston A. At the same time, the push rod of isolation fixed clamp under the control of the arc plate of isolation fixed clamp causes the isolation fixed clamp to fall to clamp piston A and fix piston A in the isolation area such that piston A is converted from the working movable piston into the isolation fixed piston. The piston conversion progress of the isolation area ends and the piston shift progress still goes on.

The rotary internal combustion engine keeps on running under inertia. Piston A is still clamped by the isolation fixed clamp and fixed in the isolation area. Piston C and piston B driven by the movable clamp keeps on running, the combustible gas mixture in the cylinder section between Piston C and piston B keeps on running and moving, and the combustible gas mixture continues to be filled into the cylinder section between Piston A and piston B. The piston shift progress still goes on. When piston C runs to the working fixed clamp, the push rod of working fixed clamp falls into the beforehand falling arc plate of working fixed clamp such that the working fixed clamp clings to the running piston C. When the claw clamp slot of piston C runs to the working fixed clamp, the push rod of shift piston movable clamp under the control of the arc plate of shift piston movable clamp pulls the shift piston movable clamp such that the shift piston movable clamp releases piston C to withdraw into the wall of the movable cylinder. Afterwards, the push rod of working fixed clamp under the control of the arc plate of working fixed clamp push the working fixed clamp to fall to grab piston C such that piston C is converted from the shift piston movable piston into the working fixed piston. The piston shift progress ends and the gas charging compression progress starts.

The rotary internal combustion engine keeps on running with the aid of the inertia of the movable cylinder and the auxiliary wheel. Piston A is still clamped by the isolation fixed clamp and fixed in the isolation area. Piston C is clamped still by the working fixed clamp. The movable cylinder drives piston B to rotate operationally. The combustible gas mixture carried in position in the cylinder section between piston C and piston B is subject to the second compression. The volume of the cylinder section between piston A and piston B continues to increase due to the running of piston B and the combustible gas mixture continues to be filled into this cylinder section. When piston B moves to the compression fixed clamp, the push rod of compression fixed clamp falls into the beforehand falling arc plate of compression fixed clamp for the compression fixed clamp to cling to piston B which is running. When the claw clamp slot of piston B moves to the compression fixed clamp, the push rod of compression movable clamp under the control of the arc plate of compression movable clamp pulls the compression movable clamp to release piston B to withdraw into the wall of the movable cylinder. At the same time, the push rod of compression fixed clamp under the control of the arc plate of compression fixed clamp extends into the wall of the gas cylinder to clamp piston B. Piston B is converted from the compression movable piston into the compression fixed piston and the no load progress of the movable cylinder starts. At this instant, three pistons in the rotary internal combustion engine are clamped by the fixed clamps on the stationary cylinder and the movable cylinder free of load runs with the aid of inertia.

The rotary internal combustion engine keeps on running with the aid of the inertia of the movable cylinder and the auxiliary wheel. When the working movable clamp moves to piston C, the push rod of working movable clamp falls into the beforehand falling arc plate of working movable clamp. The rotary internal combustion engine keeps on running and the rotary internal combustion engine still runs in the no load progress of the movable cylinder. When the working movable clamp moves to the piston claw clamp slot of piston C, the push rod of working fixed clamp on the stationary cylinder under the control of the arc plate of working fixed clamp on the auxiliary wheel pulls the working fixed clamp such that the working fixed clamp releases piston C to withdraw into the wall of the stationary cylinder. The push rod of working movable clamp on the movable cylinder under the control of the arc plate of working movable clamp on the arc plate seat of the movable cylinder pushes the working movable clamp to fall to clamp piston C. The working fixed piston is converted into the working movable piston and, in the meantime, the spark plug ignites to explode the compressed combustible gas mixture for driving piston C to run and in turn to drive the movable cylinder, the power output shaft and the auxiliary wheel to run together synchronously. Thus, the working exhaustion progress starts, and the cycle reciprocates accordingly.

As disclosed above, three pistons in the gas cylinder of the rotary internal combustion engine under the control of the arc plate usually and cyclically switches working modes through the push rod to drive the movable cylinder to run and outputs power though the power output shaft.

The gas cylinder is a hollow elliptical ring cavity made up of two internal and external semi elliptical cavities having the same curvature sectionally, i.e. a stationary cylinder and a movable cylinder. The stationary cylinder is a hollow ring wherein the interior of the ring is a semi elliptical cavity concave inward. The movable cylinder is a ring wherein the interior thereof is fixed on the power output shaft through a conjoined body and the exterior of the ring is a semi elliptical cavity concave inward. The movable cylinder is provided in the hollow ring of the stationary cylinder. The semi elliptical ring concave inward on the interior of the stationary cylinder and the semi elliptical ring concave inward on the exterior of the movable cylinder combines into an elliptical ring cavity as a gas cylinder of the internal combustion engine. On both sides of the gas cylinder joined by the movable cylinder and the stationary cylinder, the junction shows a concave-convex joint. The junction of the concave-convex joint on the stationary cylinder is provided with an oil hole of oil passage to fill the engine oil. The junction of the concave-convex joint on the movable cylinder is provided with an oil passage. The concave-convex joint and the lubrication by the engine oil of the oil passage seal the junction of the stationary cylinder and the movable cylinder to enable the movable cylinder to run in a lubricative condition to prevent the stationary cylinder and the movable cylinder from wearing out.

The section of the gas cylinder is elliptical to prevent the piston moving in the gas cylinder from swaying, eliminate the unnecessary movement and reduce the mechanical abrasion to facilitate to be clamped by the piston claw clamp. Inside the shell, an arc plate seat of the movable cylinder is provided between the working fixed clamp and the isolation area on both the interior and exterior of the stationary cylinder. On the stationary cylinder, there are provided with an intake port, an exhaust port, a combustion chamber, a spark plug, a spray chamber, a spray plug, three pairs of movable piston claw clamps and three pairs of spring cups. On the movable cylinder, there are provided with three pairs of movable piston claw clamps and three pairs of spring cups.

The piston, a short body having the same curvature as the gas cylinder and the same elliptical section as the gas cylinder, is smaller than the gas cylinder sectionally. Both fore- and aft faces of the piston are slightly concave and perpendicular to the center of the gas cylinder. On both ends of the piston, a piston ring and an oil ring are provided. Above and below the middle of the piston, one pair of claw clamp slots are respectively provided. An oil hole of oil passage is provided in the claw clamp slot to fill the engine oil. On either slot bank of the claw clamp slot, a movable guiding block is provided. When the claw clamp falls to grab the piston, it will firstly contact with the guiding block. Under the pressure of the claw clamp, the edge of the slot will sink to guide the claw clamp into the slot bottom of the piston claw clamp slot. On restoring, the guiding block biases against the claw clamp.

Still another object of the present invention is to present a configuration in which, in front and behind the middle of each pair of piston ring and oil ring of these pistons, there are semi-circular lids which can jointly form a circular spray chamber seal sheet such that the combustion chamber or the spray chamber may be covered to bring about the effect to seal off the combustion chamber or the spray chamber.

Still another object of the present invention is to present a configuration in which the exhaust port on the stationary cylinder is provided between the working cylinder section and the isolation area. When the piston passes by the exhaust port which opens normally, the latter closes temporarily. The exhaustion through the exhaust port is unobstructed without interruption or break, stable and low in atmosphere pressure. For the purpose that when the piston passes by the exhaust port, the piston ring and the oil ring will not stagnate on the exhaust port, the exhaust port on the gas cylinder face of the stationary cylinder has a longitudinal accurate stripe having the same curvature as the gas cylinder for the piston to pass by the exhaust port smoothly. A condenser is provided outside of the exhaust port to recycle the vapor exhausted from the gas cylinder.

Still another object of the present invention is to present a configuration in which the intake port on the stationary cylinder is provided between the air charging compression cylinder section and the isolation area. A check valve is provided in the intake port to prevent the combustible gas mixture inside the gas cylinder from escaping out of the gas cylinder due to expansion under the heat of the gas cylinder. Therefore, the intake port opens usually for the intake of gas and closes usually to avoid the exhaustion of gas. For the purpose that when the piston passes by the intake port, the piston ring and the oil ring will not stagnate on the intake port, the intake port on the gas cylinder face of the stationary cylinder has a longitudinal accurate stripe having the same curvature as the gas cylinder for the piston to pass by the intake port smoothly.

The guiding block with the aid of the inclination on the claw clamp slot toward the claw clamp to increase the width allows the claw clamp to enter the claw clamp slot. Each piston in each cylinder section of the gas cylinder revolves in turn to incessantly switch working modes and coordinate each other to cooperate with the express gate such that the internal combustion engine to run stably. The piston clamped by the movable clamp to rotate is referred as movable piston, while the piston clamped by the fixed clamp still is referred as fixed piston.

The piston claw clamps disclosed above are provided in pairs on the stationary cylinder and the movable clamp. Each pair of piston claw clamps is provided on either side of the stationary cylinder and the movable clamp in the gas cylinder and embedded in the wall of the gas cylinder. The tip of the piston claw clamp is adjacent to the juncture of the stationary cylinder and the movable clamp the other rotatable end of which is provided on a pin inside the wall of the gas cylinder. The back of the piston claw clamp embedded in the wall of the gas cylinder connects with the push rod in the spring cup. When the piston passes by, the piston claw clamp under the control the arc plate and the spring in the spring cup extends into the gas cylinder to clamp and lock both sides of the piston by the waist or retract to release the piston to let it pass.

The piston claw clamp on the movable cylinder is uniformly referred as movable clamp which rotates together with the movable cylinder. Upon rotating to the piston required to be clamped, the movable clamp under the control of the spring in the spring cup falls to clamp and lock the piston or retracts to release the piston. According to various working situations, the movable clamp is respectively referred as working movable clamp, compression movable clamp and shift piston movable clamp. The piston claw clamp on the stationary cylinder is uniformly referred as fixed clamp which is fixed on a predetermined position of the stationary cylinder. According to various working situations, the fixed clamp is respectively referred as working fixed clamp, compression fixed clamp and shift piston fixed clamp.

The claw clamp not grabbing and clamping the piston is embedded in the wall of the gas cylinder. The curvature of the portion of the gas cylinder embedded with the claw clamp is totally the same as that of the interior of the gas cylinder to obtain a function to seal the gas cylinder for the piston to pass through smoothly. Upon clamping the piston, the claw clamp is partly on the inner wall of the gas cylinder and partly in the clamp slot of the piston to drive the piston to move or clamp the piston still. Upon clamping the piston, the claw clamp extends obliquely into the gas cylinder to lock tightly onto the slot bottom of the piston to pull the piston in the direction of the claw clamp and reduce the abrasion between the running piston and the stationary cylinder and that between the stationary piston and the running movable cylinder. The claw tip goes beyond the radius of the piston ellipse such that the plane of the force exerted by the claw clamp to grab the piston exceeds the semi-circular arc of the piston ellipse for the claw clamp to strongly and stably grab, clamp and lock the piston. An oil passage and an oil hole are provided on the claw clamp. When the claw clamp falls to clamp the piston, the oil passage on the claw clamp and the oil passage on the piston communicate with each other for the engine oil to pass through. When the claw clamp retracts, the oil passage closes.

The spark plug disclosed above is provided on the combustion chamber of the stationary cylinder. At the instant that the working movable clamp clamps the working fixed piston, i.e. at the instant that the working fixed piston is converted into the working movable piston, the spark plug ignites the combustible gas mixture.

The spray plug disclosed above is provided on the spray chamber of the stationary cylinder. When the combustible gas mixture in the gas cylinder is about to burn out, a mist is sprayed into the gas cylinder. The mist contacts the gas of high temperature in the gas cylinder to vaporize instantaneously into steam and then expand rapidly to drive the working piston to work. The residual heat may be transformed into mechanical energy to enable the reuse of the residual heat and lower down the temperature in the gas cylinder such that the waste gas exhausted is low in temperature and free from sparkle.

This invention means positively quite a lot in lowering energy consumption, reducing the heat exhausted into the atmosphere, protecting the gas cylinder, mitigating the hazard to the environment. Furthermore, the structure of the exhaust hose is simple and lightweight is obtainable. According to actual situation, one or more spray plugs for spraying mist are provided on the desirable positions on the stationary cylinder to enhance heat utilization efficiency.

The auxiliary wheels in pair mirror reflecting each other are symmetrically fixed on the power output shaft on both sides of the gas cylinder. Along with the movable cylinder, the auxiliary wheels rotate synchronously together with the power output shaft. On the auxiliary wheel there are arc plates projecting relative to one another. The arc plates are respectively an arc plate of working fixed clamp for controlling the working fixed clamp, an arc plate of isolation fixed clamp for controlling the isolation fixed clamp and an arc plate of compression fixed clamp for controlling the compression fixed clamp. The working face of the arc plate of working fixed clamp faces the gas cylinder, and the arc plate directly presses one end of the push rod with the projecting arc to control the working fixed clamp so that the working fixed clamp extends into the gas cylinder to clamp the piston. The convex working faces of the arc plate of compression fixed clamp and the arc plate of isolation fixed clamp face the auxiliary wheels. On one end each of the push rod of compression fixed clamp and the push rod of isolation fixed clamp there is a hook. When the arc plate passes by, the hook is pulled by the arc plate whereby the compression fixed clamp or the isolation fixed clamp releases the piston to withdraw into the wall of the stationary cylinder.

The guiding block is provided between the piston claw clamp slots on both sides of pistons A, B and C, and rests on the slot bank overlapped by the piston claw clamp slots. The guiding block is stuck among pistons A, B and C and has a spring at the bottom. Usually, the guiding block under the biasing force of the spring is higher than the piston claw clamp slot. The guiding block falls with an inclination wherein the portion near the higher slot bank is very close to the wall of the gas cylinder while the portion near the lower slot bank is level with the piston body. Upon coming over clinging to the piston, the claw clamp presses the guiding block along the inclination into the piston in flush with the slot bank of the claw clamp slot to facilitate the claw clamp to cross the guiding block and then enter the claw clamp. However, the claw clamp will not cross over the claw clamp slot for the slot bank at the other side of the claw clamp slot also has a guiding block which is not pressed down and thus higher than the slot bank of the claw clamp slot to block the claw clamp. Therefore, the claw clamp has to enter the claw clamp slot. The claw clamp entering the claw clamp slot to perform the function of piston conversion means also that the other pair of claw clamps relatively release the piston to terminate the original function. Two pairs of claw clamps respectively release firstly and grab next. Since the guiding block lies where the piston claw clamp slots overlap and the claw clamp for releasing and that for grabbing use commonly the same guiding block, the claw clamp for grabbing presses the guiding block into the piston while the claw clamp for releasing releases the piston to leave one portion of the claw clamp slot bottom. The guiding block is pressed down to release the piston early and at the same time the claw clamp grabbed has fallen into the slot. Thus, the claw clamp for releasing and that for grabbing under the action of the guiding block proceed seamlessly the releasing and grabbing actions. The piston is under the control of the claw clamp to the end and never unclamped.

The spring cups in pair are fixed on the back of the piston claw clamp outside of the movable cylinder and the stationary cylinder. A movable spring is provided in the spring cup. In the spring cup, there is provided with a movable push rod one end of which connects with the piston claw clamp. The spring cup of the fixed clamp fixed on the stationary cylinder stays still and doesn't rotate. The spring cup of the movable clamp fixed on the movable cylinder rotates together with the movable cylinder.

A rotatable power output shaft is provided on the semicircular shell as disclosed above. In the middle between both sides, there is provided with an axle seat in which a movable bearing is mounted. Both ends of the power output shaft are mounted on the bearing wherein one end performs power output. A movable cylinder connecting with the stationary cylinder is fixed in the shell on the power output shaft. A pair of arc plates auxiliary wheels mirror reflecting each other are fixed on the power output shaft on both sides of the gas cylinder.

The movable cylinder, the movable cylinder clamp, the piston claw clamp, the portion between axle seats on both ends of the power output shaft, the auxiliary wheel and the spring cup as mentioned above are all provided in the shell which is fixed on the hydraulic cylinder. The upper portion of the stationary cylinder is fixed on the shell while the lower portion is fixed in the hydraulic cylinder filled with the engine oil. The auxiliary wheels, the stationary cylinder and the movable cylinder are partly immersed in the engine oil inside the hydraulic cylinder. When the internal combustion engine works, the power output shaft, the arc plate and the movable cylinder run rapidly to force the engine oil to splash onto the components required to lubricate. At the same time, the oil pump pumps the engine oil into the oil passage of the other components to lubricate the components inaccessible by the engine oil.

The working exhaustion progress and the air charging compression progress of the rotary internal combustion engine may be exchanged for accommodating different environments and fuels to combust and work whereby the combustion is fuller and the value of heat energy in use higher. It is significant for enlarging the fuel source and economizing energy.

When the rotary internal combustion engine disclosed above works, it accomplishes four progress cycle done by the other internal combustion engines: four progresses such as exhaust, air charging, compression and combustion. When the rotary internal combustion engine works, air charging and compression as well as combustion and exhaustion are respectively accomplished synchronously. In other words, compression and air charging proceed synchronously, and combustion for expanding and exhaustion of waste gas proceed synchronously. In comparison with the current internal combustion engine which takes two cycles to accomplish each four stroke, the present rotary internal combustion engine takes only one cycle.

The pistons grabbed and clamped by the piston claw clamps directly act on the movable cylinder and the stationary cylinder. The combustion expanding force of the combustible gas mixture acts perpendicularly at an angle the closest to 90 degrees on the piston. In turn, the piston acts on the piston claw clamp and then the piston claw clamp acts on the movable cylinder and the stationary cylinder. The movable cylinder acts with a torque at an angle the closest to 180 degrees on the power output shaft, causing the latter to twist. The incessant twist enables the power output shaft to rotate and transmit the power from the transmission machine to the working machine. During the entire working process of the internal combustion engine, the combustion expanding force of the combustible gas mixture acts perpendicularly at an angle the closest to 90 degrees on the piston and acts with a piston torque at an angle the closest to 180 degrees on the power output shaft. The cycle is invariable from the beginning to the end.

The curvature center at the middle point of the piston circular arc, the center at the middle point of the circumference of the movable piston and the center at the middle point of the circumference of the stationary cylinder lie on the same center. The central vertical line of each pair of piston claw clamps also goes through this center. Furthermore, the center of the circumference of the power output shaft also lies on the same center. The piston subject to force usually applies the torque at the best application direction to the piston claw clamp, the movable cylinder, the stationary cylinder and the power output shaft invariably.

Both the movable cylinder and the auxiliary wheel having the function to accumulate power are replaceable for the flying wheel to lighten the weight of the entire engine.

Hereinafter the working status of the present invention will be described with the working status of the piston in combination with that of the cylinder, such as a piston conversion progress in an isolation area, a piston shift progress, a air charging compression progress, a no load progress of the movable cylinder and a working exhaustion progress some of which proceed alternately.

Since the stationary cylinder disclosed above does not move, each working stage is invariable while working and compressing are alternate with each other.

Since the movable cylinder proceeds working, exhaustion, intake and compression simultaneously due to rotation, the gas cylinder section at the driving side of the movable piston clamped by the movable cylinder proceeds exhaustion during working and converts into compression after it leaves the isolation area. The other side of the movable piston works when the internal combustion engine explodes and combusts, and converts into air charging after it leaves the isolation area. The movable piston has just worked with some heat energy left over. The combustible gas mixture charged in is preheated by such cylinder section. After full air charging, the combustible gas mixture stagnates in such cylinder section for a period which is longer than the case of the reciprocating internal combustion engine more than one time. It is close to the ignition section of the stationary cylinder where there is still heat energy to preheat the combustible gas mixture. When the piston shift progress ends, the combustible gas mixture is pushed and compressed to the ignition section of the stationary cylinder where the combustible gas mixture is further preheated. When the compression of the internal combustion engine ends, the temperature of the combustible gas mixture is quite high. The combustible gas mixture needs to stagnate for a further period to proceed the no load progress. The preheating of the combustible gas mixture allows a full combustion. Furthermore, the residual heat of the cylinder is utilized to lower down the temperature of the cylinder.

The rotary internal combustion engine may be of compression ignition type wherein the torque at optimum angle and the preheating of gas ensure the normal operation of the engine of such type and is incomparable with the other internal combustion engines.

The rotary internal combustion engine may be designed as outer cylinder power output, i.e. the outer cylinder functions as the movable cylinder while the inner cylinder functions as the stationary cylinder. The outer cylinder power output is obtainable by the provision of the components of the inner cylinder on the outer cylinder and the components of the outer cylinder on the inner cylinder. It is possible to provide multiple explosion and ignition points and several sets of components in a cylinder to obtain multiple work sections in a cylinder of multiple cylinder sections to enhance the power of the internal combustion engine. It is also possible to fix multiple cylinders on a power output shaft wherein every additional cylinder is provided with an auxiliary wheel on a power output shaft to run multiple cylinders to enhance power. The most preferred way is multiple cylinders multiple explosions wherein a cylinder of multiple explosions and ignition working sections run on same one power output shaft to obtain the greatest power output.

Since the present invention adopts the above mentioned technical measures as the rotary internal combustion engine devised previously by the inventor, the present invention bears the advantages of rotary internal combustion engine, rotary engine and reciprocating four progress cycle engine and those as follows:

1. compactness, lightweight and one time or more greater output power ratio than the engines of the same mass and volume;
2. uniform power output and great torque which is invariable and stable;
3. small vibration and little noise;
4. high and stable waste gas exhaust rate, continuity, low temperature without sparks, little exhaust noise and good idle performance;
5. high heat utilization rate, saving one fourth of fuel and little pollution;
6. simple structure, easiness in designing and convenience at adjustment and test;
7. low requirement in process manufacturing to facilitate the production of large scale;
8. absence of backfire and knock frequently found in the contemporary internal combustion engine;
9. variety in modes whereby outer cylinder power output, inner cylinder power output, single cylinder single explosion or single cylinder multiple explosions or multiple cylinders single explosion or multiple cylinders multiple explosions are optional as needed;
10. impact mitigated due to the moderate temperature inside the cylinder to lengthen the duration of the components and the possible replacement of the material of the internal combustion engine with the other materials such as engineering plastics and ceramic;
11. reduced components, simple structure and high reliability and security;
12. low mechanical loss; and
13. the interchangeability of the working exhaustion progress and the air charging compression progress to accommodate itself to different fuel needs.

In addition to the above advantages, the present invention absent of such elements as express gate and solenoid valve is capable of avoiding the problem of mechanical damage when the circuit of the rotary internal combustion engine fails as a result of which the solenoid valve doesn't work and the piston of the rotary internal combustion engine in turn hit the express gate. The present invention directly uses an arc plate in place of the prying arm for controlling the push rod to reduce the constituent components and enhances the reliability.

BRIEF DESCRIPTION OF THE SEVERAL VIEWS OF THE DRAWINGS

To facilitate better understanding and appreciation of the objects, technical features and effects of the present invention, a detailed description of the embodiments in conjunction with figures is given as follows, wherein.

DETAILED DESCRIPTION OF THE INVENTION

To describe the technical contents, characteristics in structure, objects to be accomplished and effects of the present invention in details, a detailed description of the embodiments made in conjunction with the attached figures is given as follows.

Figure 1:
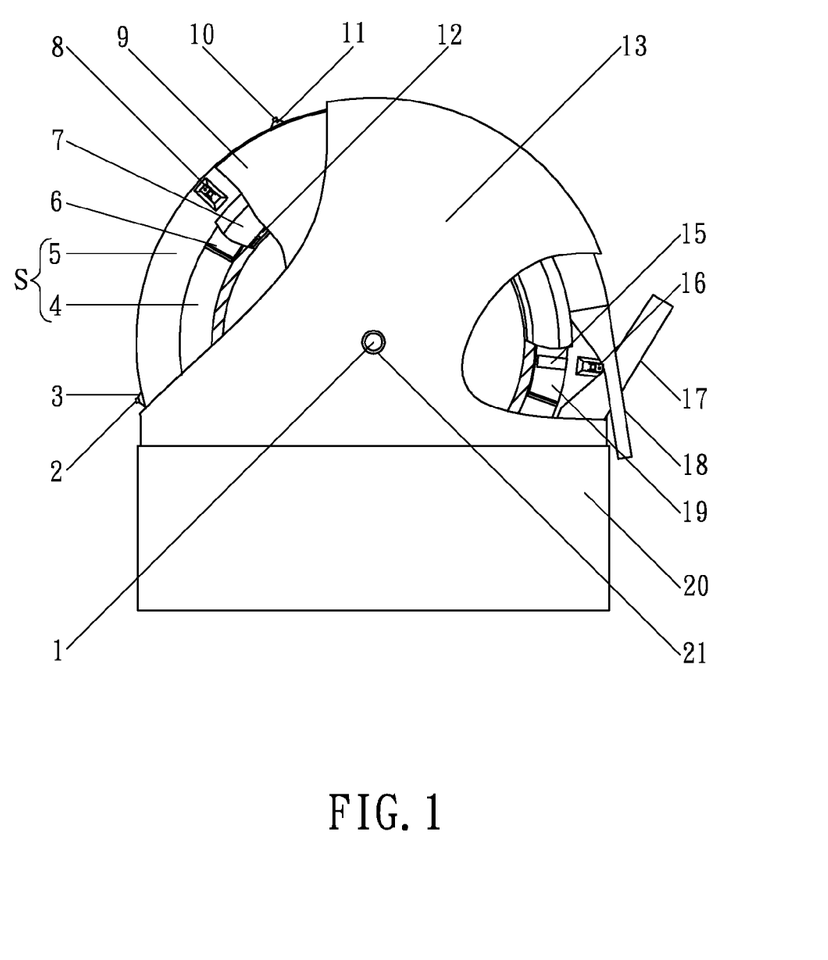
FIG. 1 is a view showing the structure of the present invention.
Figure 2:
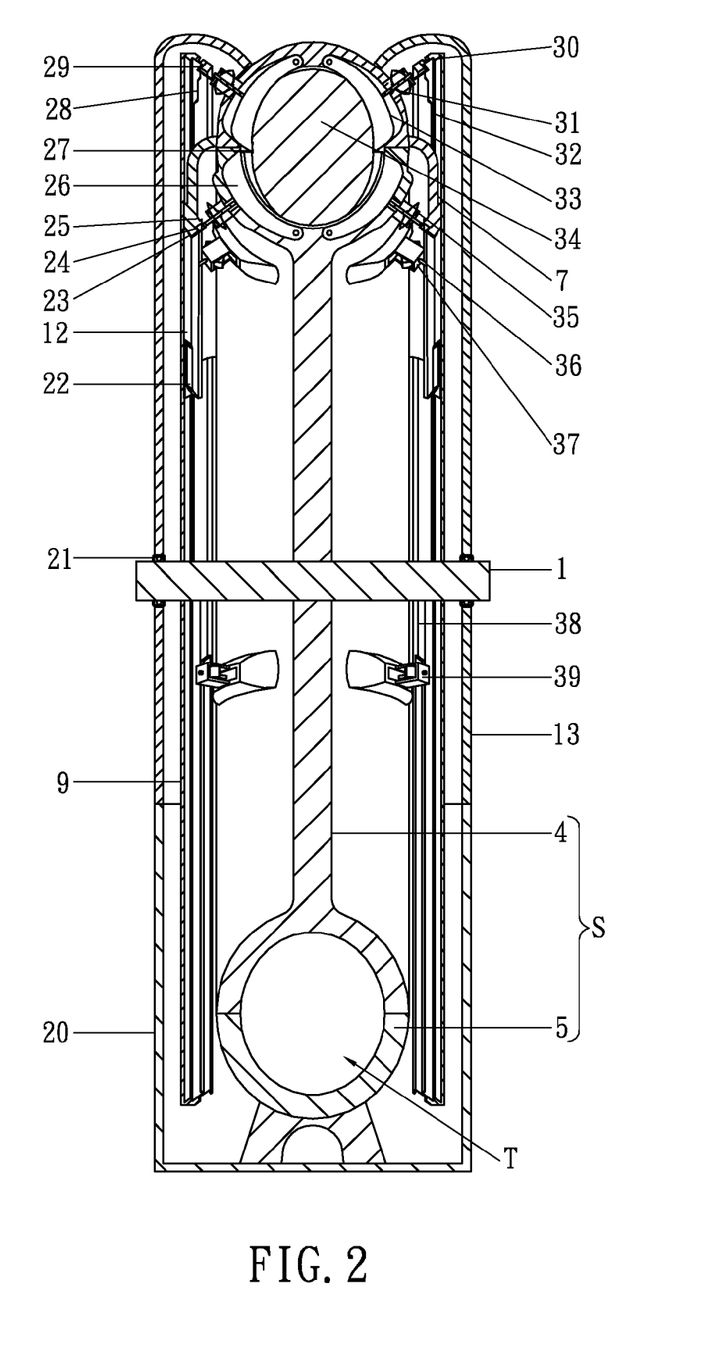
FIG. 2 is a longitudinal sectional view showing the structure of the present invention.

Referring to FIGS. 1 and 2, the rotary internal combustion engine of the present invention comprises a hydraulic cylinder 20 and a semicircular shell 13 fixed on the hydraulic cylinder 20. The shell 13 connects with a stationary cylinder 5 of a gas cylinder S, wherein the gas cylinder S is jointly formed by the stationary cylinder 5 and a movable cylinder 4. On the stationary cylinder 5, the following components are sequentially provided: a combustion chamber 11, a spray chamber 3, an intake hose 18, an exhaust hose 17, a spring cup 31 of compression fixed clamp, a spring cup 16 of isolation fixed clamp, a spring cup 8 of working fixed clamp and an arc plate seat 7 of movable cylinder. A spark plug 10 is fixed in the combustion chamber 11, and a spray plug 2 is fixed in the spray chamber 3. On the inner wall of the stationary cylinder 5, there are provided with a compression fixed clamp 33, an isolation fixed clamp 15 and a working fixed clamp 50 (referring to what are illustrated in FIG. 3 to FIG. 9) which are embedded into the cylinder wall of the stationary cylinder 5. On the arc plate seat 7, there are provided with an arc plate 12 of working movable clamp, an arc plate 24 of shift piston movable clamp and an arc plate 25 of compression movable clamp. Respectively, a beforehand falling arc plate 22 of working movable clamp is provided on the arc plate 12 of working movable clamp, a beforehand falling arc plate 44 of shift piston movable clamp on the arc plate 24 of shift piston movable clamp, and a beforehand falling arc plate 48 of compression movable clamp on the arc plate 25 of compression movable clamp. The spring cup 31 of compression fixed clamp, the spring cup 16 of isolation fixed clamp and the spring cup 8 of working fixed clamp are respectively provided outside of the stationary cylinder 5 at a position corresponding to the compression fixed clamp 33, the isolation fixed clamp 15 and the working fixed clamp 50. The spring cup 31 of compression fixed clamp, the spring cup 16 of isolation fixed clamp and the spring cup 8 of working fixed clamp are respectively provided with a spring in which a push rod 36 is inserted. Ends of these push rods 36 are respectively connected to the compression fixed clamp 33, the isolation fixed clamp 15 and the working fixed clamp 50. The other end of the push rod 36 of the working fixed clamp 50 contacts with an arc plate 38 of working fixed clamp at least on an auxiliary wheel 9 (referring to what are illustrated in FIG. 3 to FIG. 9). The push rod 36 of the compression fixed clamp 33 and that of the isolation fixed clamp 15 respectively contact with an arc plate 32 of compression fixed clamp and an arc plate 30 of isolation fixed clamp through a hook of an arc plate 29 of working fixed clamp and a hook of isolation fixed clamp (not designated with a reference number).

In the middle between both sides of the shell 13, there is provided with a bearing 21 on which a rotatable power output shaft 1 is mounted. Two auxiliary wheels 9 opposite to each other are fixed on the power output shaft 1 in the shell 13, respectively. A movable cylinder 4, which is linked through a conjoined body of the movable cylinder 4, is fixed on the power output shaft 1 between these auxiliary wheels 9. The stationary cylinder 5, which is circular ring, and is mounted on the periphery of the movable cylinder 4 to form a gas cylinder S having a circular chamber T therein between the stationary cylinder 5 and the movable cylinder 4. On the interior of the stationary cylinder 5, there is provided with a semi-elliptical concave cavity, which can combine with another semi-elliptical concave cavity on the exterior of the movable cylinder 4 into an elliptical ring cavity of the gas cylinder S. The upper portion of the stationary cylinder 5 is fixed on the shell 13, while the lower portion thereof is fixed on the hydraulic cylinder 20 filled with engine oil therein. The stationary cylinder 5, the movable cylinder 4 and the auxiliary wheel 9 are immersed in the engine oil inside of the hydraulic cylinder 20.

On the inner wall of the movable cylinder 4, a working movable clamp 26, a shift piston movable clamp 41 (referring to what are shown in FIG. 3 to FIG. 9) and a compression movable clamp 43 (referring to what are shown in FIG. 3 to FIG. 9) are mounted. The working movable clamp 26, the shift piston movable clamp 41 and the compression movable clamp 43 are embedded into the wall of the movable cylinder 4. On the exterior of the movable cylinder 4 corresponding to the working movable clamp 26, the shift piston movable clamp 41 and the compression movable clamp 43 are respectively provided with a spring cup 35 of working movable clamp, a spring cup 39 of shift piston movable clamp and a spring cup 37 of compression movable clamp. Springs are respectively mounted in the spring cups of the movable cylinder 4 and the stationary cylinder 5. A push rod 36 is embedded into each spring. One end of the push rod 36 is connected to the back of a claw clamp. The other end of the push rod 36 of the spring cup 37 of compression movable clamp and the spring cup 39 of shift piston movable clamp can respectively contact the arc plate 25 of compression movable clamp and the arc plate 24 of shift piston movable clamp. The push rod 36 of the spring cup 35 of working movable clamp can contact the arc plate 12 of working movable clamp through a hook 23 of working movable clamp.

On the auxiliary wheel 9, an arc plate 38 of working fixed clamp, an arc plate 32 of compression fixed clamp and an arc plate 30 of isolation fixed clamp are mounted. On the arc plate 38 of working fixed clamp, a beforehand falling arc plate 40 of working fixed clamp (referring to what are shown in FIG. 3 to FIG. 9) is provided. On the arc plate 32 of compression fixed clamp, a beforehand falling arc plate 28 of compression fixed clamp is provided. And on the arc plate 30 of isolation fixed clamp, a beforehand falling arc plate 42 of isolation fixed clamp (referring to what are shown in FIG. 3 to FIG. 9) is provided.

On either side of an isolation area 52 (referring to what are shown in FIG. 3 to FIG. 9) on the stationary cylinder 5, an intake port 45 (referring to what are shown in FIG. 3 to FIG. 9) and an exhaust port 49 (referring to what are shown in FIG. 3 to FIG. 9) are respectively provided.

For convenience to describe the details of this invention, three pistons of the rotary internal combustion engine of this invention are respectively defined as piston A 6, piston B 19 and piston C 34, which are able to rotate inside the circular chamber T of the gas cylinder S along center axis of the rotatable power output shaft 1.

On both ends of each of piston A 6, piston B 19 and piston C 34, an oil ring and a piston ring are respectively mounted. On the middle portion of each of piston A 6, piston B 19 and piston C 34, two pairs of piston claw clamp slots 47 (referring to what are shown in FIG. 3 to FIG. 9) are respectively and vertically provided. On either slot bank of the piston claw clamp slots 47, a guiding block 27 is respectively and movably mounted. On the middle portion inside of the stationary cylinder, a semi-circular disc is respectively provided fore and aft. The oil ring and the piston ring may combine into a circular sealing sheet 46 of spray chamber (referring to what are shown in FIG. 3 to FIG. 9) through these discs. The sealing sheet 46 of spray chamber functions to seal the combustion chamber and/or the spray chamber 3 when the oil ring and the piston ring pass by the combustion chamber and/or the spray chamber 3 such that the gas of high pressure will flow toward the low pressure area.

The guiding block 27 is provided between the piston claw clamp slots 47 (referring to what are shown in FIG. 3 to FIG. 9) on both sides of piston A 6, piston B 19 and piston C 34 and rests on the slot bank of the piston claw clamp slots 47. Both sides of the guiding block 27 are stuck among piston A 6, piston B 19 and piston C 34. The bottom portion of the guiding block 27 is provided with a spring. Normally, under the action of the spring, the guiding block 27 projects outside of the piston claw clamp slots 47. The guiding block 27 is configured that the higher portion adjacent to the slot bank is quite close to the wall of the gas cylinder S, while the lower portion is in flush with the piston body, being inclined from the higher portion to the lower portion. When a claw clamp comes along clinging to one of piston A 6, piston B 19 and piston C 34 and falls to grab piston A 6, piston B 19 or piston C 34, it will firstly contact with the guiding block 27 and then push the guiding block 27 into piston A 6, piston B 19 and piston C 34 along the inclined face of the guiding block 27, such that the guiding block 27 is in flush with the slot bank of the piston claw clamp slots 47 to facilitate the claw clamp to climb over the guiding block 27 into the piston claw clamp slots 47. However, the claw clamp will not cross over the piston claw clamp slots 47 since another guiding block 27 is further provided on the slot bank at the other side of the piston claw clamp slots 47. The other guiding block 27 will not be pressed down by the claw clamp. The other guiding block 27 higher than the slot bank of the piston claw clamp slots 47 will block the claw clamp to force the claw clamp into the piston claw clamp slots 47. The process that the claw clamp enters the piston claw clamp slots 47 is concerned with the conversion function of piston A 6, piston B 19 or piston C 34. In other words, at the same time when the claw clamp enters the piston claw clamp slots 47 and grab piston A 6, piston B 19 or piston C 34, the other claw clamp will release piston A 6, piston B 19 or piston C 34 and stop the original function. Each of the above two pairs of claw clamps proceeds releasing and grabbing. And, since the guiding block 27 locates between the piston claw clamp slots 47, the claw clamps which releases or grabs use commonly the same guiding block 27. Therefore, when the claw clamp grabs and presses the guiding block 27 into piston A 6, piston B 19 or piston C 34, the claw clamp at the other side releases piston A 6, piston B 19 or piston C 34 and will leave one portion of the bottom of the piston claw clamp slots 47. The shift of the guiding block 27 enables the progress that piston A 6, piston B 19 or piston C 34 are released and the progress that the claw clamp grabbing piston A 6, piston B 19 or piston C 34 fall into the slot to proceed synchronously. Thus, the claw clamp which releases and grabs may proceed releasing and grabbing under the action of the guiding block 27 seamlessly to enable piston A 6, piston B 19 and piston C 34 to stay under the control of the claw clamp to the end and no unclamping will occur.

According to the present invention, a datum line 51 (referring to what FIG. 3 to FIG. 9 show) of the rotary internal combustion engine lies on the movable cylinder 4 and the auxiliary wheel 9. More specifically, it lies on the line from the center of the circumference of the movable cylinder 4 to the center of the working movable clamp 26, and the line from the center of the auxiliary wheel 9 to the releasing and clamping dead point of the arc plate 38 of working fixed clamp and that of the arc plate 30 of isolation fixed clamp. Only when the datum line 51 on the auxiliary wheel 9 perpendicularly overlaps with that on the movable cylinder 4, the rotary internal combustion engine can normally run. Since the center of the auxiliary wheel 9 and that of the movable cylinder 4 lies on that center of the power output shaft 1 and on the same line, once one of the releasing and clamping dead points of the working movable clamp 26 and one of the releasing and clamping dead points of the arc plate 38 of working fixed clamp or one of the releasing and clamping dead points of the arc plate 30 of isolation fixed clamp perpendicularly overlaps with each other, the perpendicularly overlapping effect of two datum lines 51 is obtainable.

Referring to what FIG. 3 to FIG. 9 show, the running way of the rotary internal combustion engine is further described in details with a preferred embodiment of this invention. The curved arrows in the drawings designate the running direction of the movable cylinder 4 and the auxiliary wheel 9. As shown, the conjoined body of the movable cylinder 4 is replaced by the auxiliary wheel 9. The movable cylinder 4 and the auxiliary wheel 9 of the rotary internal combustion engine run synchronously on the power output shaft 1. Piston A 6, piston B 19 and piston C 34 are controlled by the claw clamps in the shell to continuously switch function cycles to perform stationary and running works.

Figure 3:
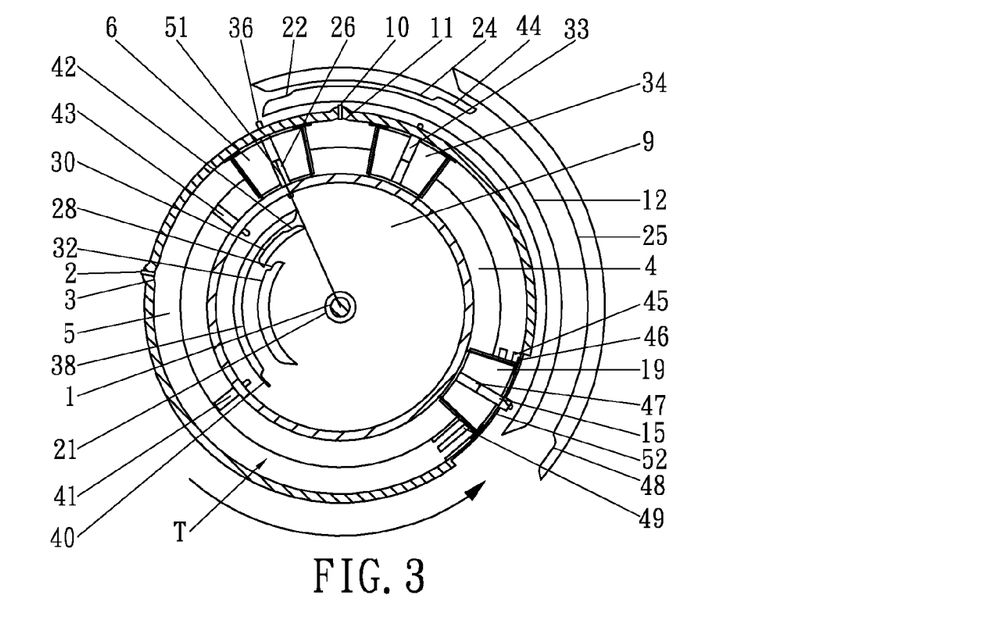
FIG. 3 is a sectional view schematically showing a working exhaustion progress of the present invention.

Referring to the state shown in FIG. 3, the rotary internal combustion engine runs under inertia. The movable cylinder 4, the power output shaft 1 and the auxiliary wheel 9 run together synchronously to complete the no load progress of the movable cylinder and advance to the state of the working exhaustion progress. The working movable clamp 26 has clamped piston A 6 while the compression fixed clamp 33 clamps piston C 34 still. Furthermore, piston A 6 and piston C 34 seal the combustible gas mixture inside the gas cylinder S to complete compression. Piston B 19 is clamped by the isolation fixed clamp 15 and fixed in the isolation area 52. The sealed gas cylinder S section between piston C 34 and piston B 19 is filled with the combustible gas mixture.

When the no load progress of the movable cylinder 4 is completed and the working movable clamp 26 in the movable cylinder 4 clamps piston A 6 of the working fixed piston, the spark plug 10 ignites to explode the compressed combustible gas mixture for driving piston A 6 to run and convert piston A 6 from the working fixed piston into the working movable piston. Piston A 6 drives the movable cylinder 4, the power output shaft 1 and the auxiliary wheel 9 to run together synchronously through the working movable clamp 26. At the same time, the waste gas is exhausted outside of the exhaust port 49 through the exhaust hose 17 (as shown in FIG. 1), such that the rotary internal combustion engine advances to the working exhaustion progress and that the no load progress of the movable cylinder ends. After piston A 6 passes by the spray chamber 3, the spray plug 2 sprays the mist into the gas cylinder S. After the mist enters the gas cylinder S, it will become vapor at high temperature. The vapor expands to forcibly drive piston A 6 to run and lower the temperature in the gas cylinder S. When piston A 6 moves to the exhaust port 49, the push rod 36 of the compression movable clamp 43 in the movable cylinder 4 has entered the beforehand falling arc plate 48 of compression movable clamp, and the compression movable clamp 43 clings to piston B 19 to run. When the compression movable clamp 43 moves to the piston claw clamp slot 47 of piston B 19, under the control of the arc plate 30 of isolation fixed clamp on the auxiliary wheel 9, the isolation fixed clamp 15 on the isolation area 52 will release piston B 19 as the isolation piston to withdraw into the wall of the stationary cylinder 5. At the same time, under the control of the arc plate 25 of compression movable clamp, the compression movable clamp 43 extends into the gas cylinder S to clamp piston B 19 as the isolation fixed piston. The exhaustion progress ends and piston B 19 is converted into the compression movable piston. At this moment, the isolation area piston conversion progress starts.

Figure 4:
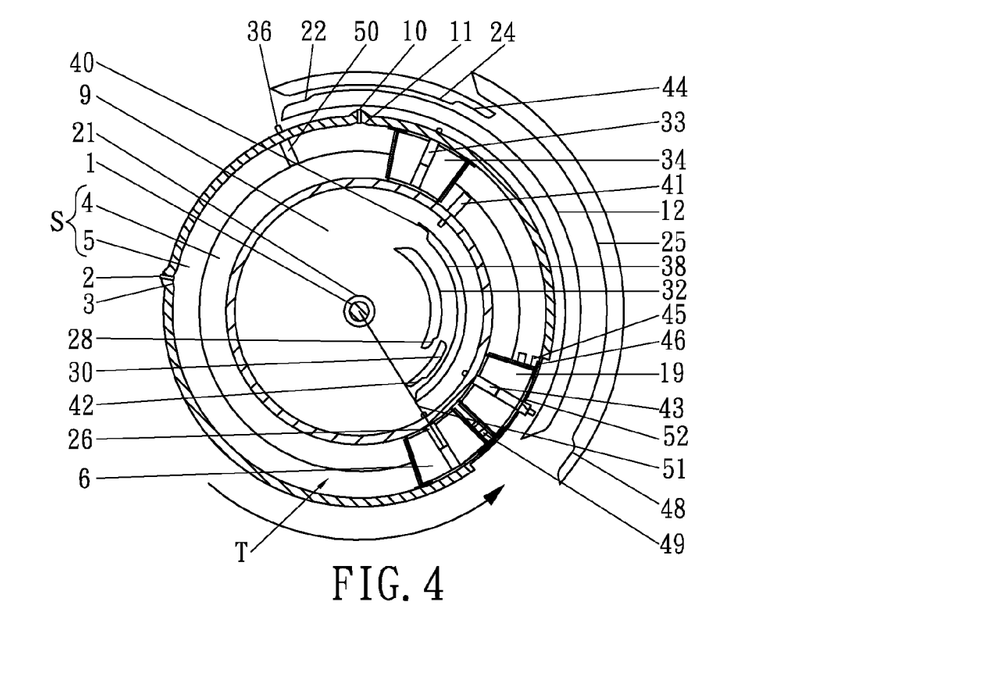
FIG. 4 is a sectional view schematically showing the initial compression of the present invention.

Referring to FIG. 4, under the expanding force, the rotary internal combustion engine keeps on running and drives piston B 19. Piston B 19 seals off the intake port 45 in turn and then proceeds an initial compression on the combustible gas mixture in the gas cylinder S section between piston C 34 and piston B 19. Upon moving to the exhaust port 49, piston A 6 will completely close the exhaust port 49. The push rod 36 of the shift piston movable clamp 41 in the movable cylinder 4 enters the beforehand falling arc plate 44 of shift piston movable clamp, enabling the shift piston movable clamp 41 to cling to piston C 34 to move. After piston A 6 crosses the exhaust port 49, the exhaust port 49 is exposed. At this moment, the working exhaustion progress completely ends. The rotary internal combustion engine begins to keep on running with the aid of the inertia of the movable cylinder 4 and the auxiliary wheel 9, and the expansible exhaust gas inside the rotary internal combustion engine will be discharged to the outside thereof through the exhaust port 49. In the meanwhile, the movable cylinder 4 keeps on driving the piston A 6 and piston B 19 in running, and the isolation area piston conversion progress keeps on going.

Figure 5:
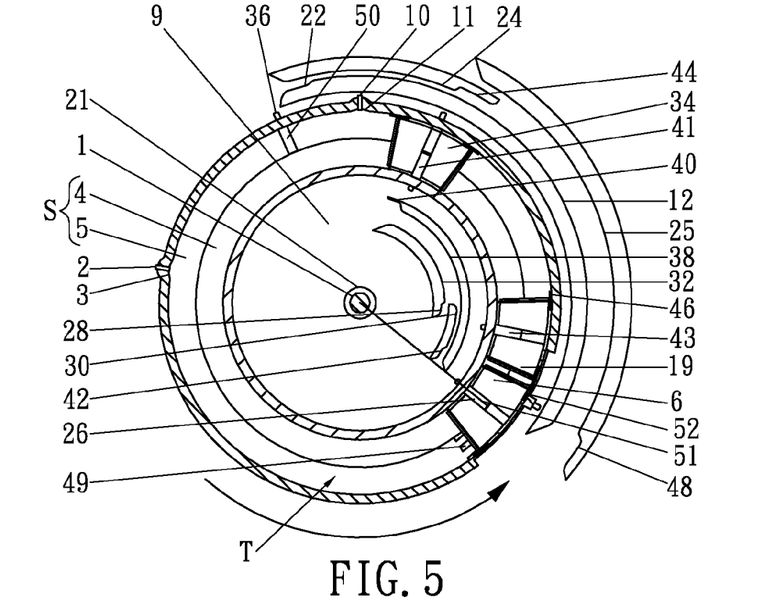
FIG. 5 is a sectional view schematically showing a piston conversion progress on an isolation area of the present invention.

Referring to FIG. 5, at this moment, the shift piston movable clamp 41 moves to the piston claw clamp slot 47 (as shown in FIG. 3) of piston C 34. And, under the control of the arc plate 32 of compression fixed clamp, the push rod 36 of compression fixed clamp 33 on the stationary cylinder 5 will retract the compression fixed clamp 33 (as shown in FIG. 3) from the piston claw clamp slot 47 of piston C 34 and restore it into the wall of the stationary cylinder 5. At the same time, under the control of the arc plate 24 of shift piston movable clamp, the push rod 36 of the shift piston movable clamp 41 will push the shift piston movable clamp 41 into the piston claw clamp slot 47 of piston C 34, whereby piston C 34 is further converted from the compression fixed piston into the shift piston fixed piston to start the piston shift progress.

The combustible gas mixture in the gas cylinder S section between piston C 34 and piston B 19 is transferred to the combustion chamber cylinder section after the initial compression stops. Driven by the shift piston movable clamp 41, piston C 34 will run together with the movable cylinder 4, the auxiliary wheel 9 and the power output shaft 1 synchronously. At this moment, driven by the claw clamp of the movable cylinder, piston A, B and C 6, 19 and 34 of the rotary internal combustion engine will run together with the movable cylinder 4, the auxiliary wheel 9 and the power output shaft 1 synchronously.

Figure 6:
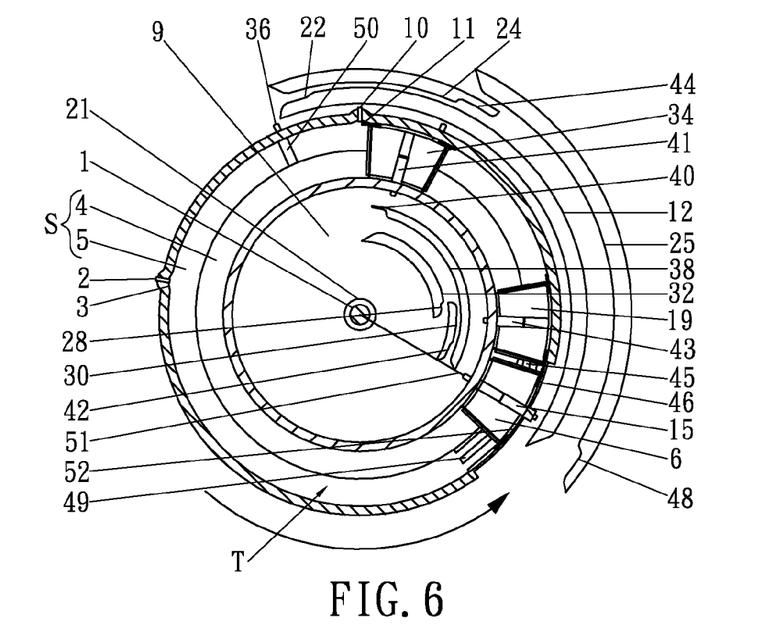
FIG. 6 is a sectional view schematically showing a piston shift progress of the present invention.

Referring to FIG. 6, at this moment, the push rod 36 of the isolation fixed clamp 15 will fall into the beforehand falling arc plate 42 of isolation fixed clamp. The isolation fixed clamp 15 clinging to piston A 6 which is moving approaches to the piston claw clamp slot 47 (as shown in FIG. 3) of piston A 6. Driven by piston C 34, the waste gas in the cylinder section of piston C 34 and the exhaust port 49 is initially exhausted.

Along with the running of the rotary internal combustion engine, the exhaust port 49 behind piston A 6 opens wider and wider. The intake port 45 will be exposed between piston A 6 and piston B 19. When piston A 6 moves amid the isolation area 52, under the control of the arc plate 12 of working movable clamp, the push rod 36 of the working movable clamp 26 (as shown in FIG. 3) on the movable cylinder 4 will retract the working movable clamp 26 to withdraw into the wall of the movable cylinder and release piston A 6. At the same time, under the control of the arc plate 30 of isolation fixed clamp, the push rod 36 of isolation fixed clamp 15 will extend into the gas cylinder S and clamp piston A 6 to fix piston A 6 on the isolation area 52, such that piston A 6 is converted from working movable piston into isolation fixed piston, and that the rotary internal combustion engine begins to fill the combustible gas mixture into the gas cylinder S section between piston A 6 and piston B 19 from the intake port 45. The isolation piston conversion progress ends while the piston shift progress still keeps on.

The rotary internal combustion engine runs with the aid of inertia. Piston A 6 is still clamped by the isolation fixed clamp 15 and fixed in the isolation area 52. Piston C 34 and piston B 19 are driven by the movable cylinder 4 to keep on running. The combustible gas mixture in the cylinder section between piston C 34 and piston B 19 keeps on flowing during running. The combustible gas mixture keeps on being filled into the cylinder section between piston A 6 and piston B 19. The piston shift progress still goes on. When piston C 34 moves to the working fixed clamp 50, the push rod 36 of working fixed clamp 50 will fall into the beforehand falling arc plate 40 of working fixed clamp. When the piston claw clamp slot 47 of piston C 34 moves to the working fixed clamp 50, under the control of the arc plate 24 of movable clamp of shift piston, the push rod 36 of the movable clamp of shift piston 41 will pull the movable clamp of shift piston 41, such that the movable clamp of shift piston 41 releases piston C 34 to withdraw into the wall of the movable cylinder. And then, under the control of the arc plate 38 of working fixed clamp, the push rod 36 of working fixed clamp 50 will push the working fixed clamp 50 to extend into the gas cylinder S to clamp piston C 34 for piston C 34 to convert from the shift piston movable piston into the working fixed piston. The piston shift progress ends while the gas charging progress starts.

Figure 7:
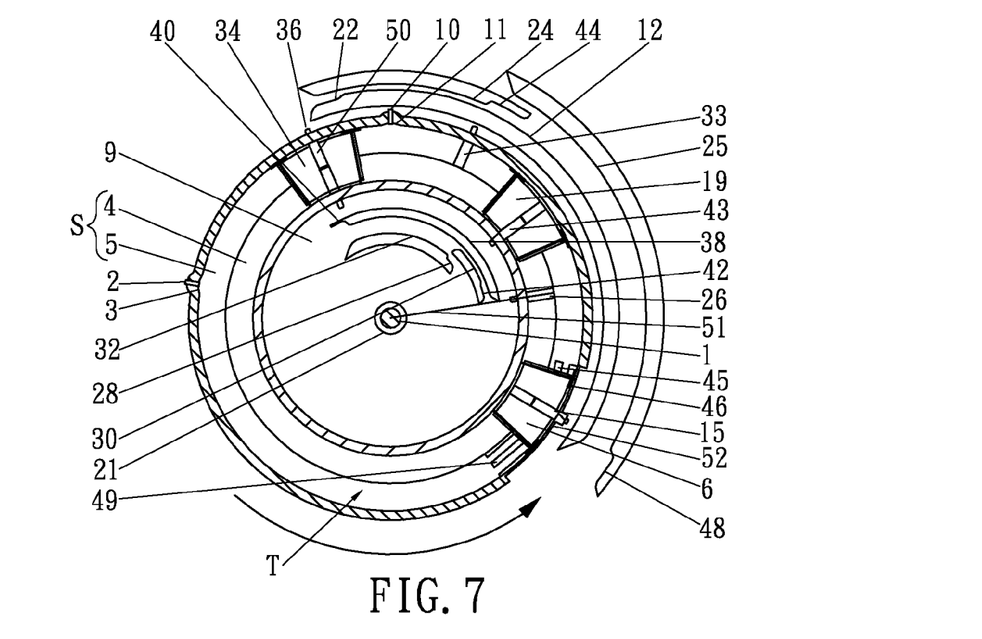
FIG. 7 is a sectional view schematically showing a air charging compression progress of the present invention.

Referring to FIG. 7, the rotary internal combustion engine keeps on running with the aid of the inertia of the movable cylinder 4 and the auxiliary wheel 9. Piston A 6 is still clamped by the isolation fixed clamp 15 and fixed in the isolation area 52. Piston C 34 is clamped still by the working fixed clamp 50. The movable cylinder 4 drives piston B 19 to rotate and run, compressing for the second time the combustible gas mixture which has flowed in position to the cylinder section between piston C 34 and piston B 19. The volume of the cylinder section between piston A 6 and piston B 19 keeps on enlarging due to piston B 19's running, and the combustible gas mixture continues to be filled into this cylinder section. When piston B 19 moves to the compression fixed clamp 33, the push rod 36 of the compression fixed clamp 33 will fall into the beforehand falling arc plate 28 of compression fixed clamp, such that the compression fixed clamp 33 clings to piston B 19 which is running. When the piston claw clamp slot 47 of piston B 19 moves to the compression fixed clamp 33, under the control of the arc plate 25 of compression movable clamp, the push rod 36 of compression movable clamp 43 will pull the compression movable clamp 43 to release piston B 19 to withdraw into the wall of the movable cylinder. At the same time, under the control of the arc plate 32 of compression fixed clamp, the push rod 36 of compression fixed clamp 33 extends into the wall of the gas cylinder S and clamps piston B 19, such that piston B 19 is converted from the compression movable piston into the compression fixed piston. At this instant, the compression of the combustible gas mixture between piston C 34 and piston B 19 is accomplished. The combustible gas mixture is filled in position into the cylinder section between piston A 6 and piston B 19. The air charging compression progress ends while the no load progress of the movable cylinder starts. Piston A 6, piston B 19 and piston C 34 in the rotary internal combustion engine are all clamped by the fixed clamp on the stationary cylinder and the movable cylinder 4 free of load runs with the aid of inertia.

Figure 8:
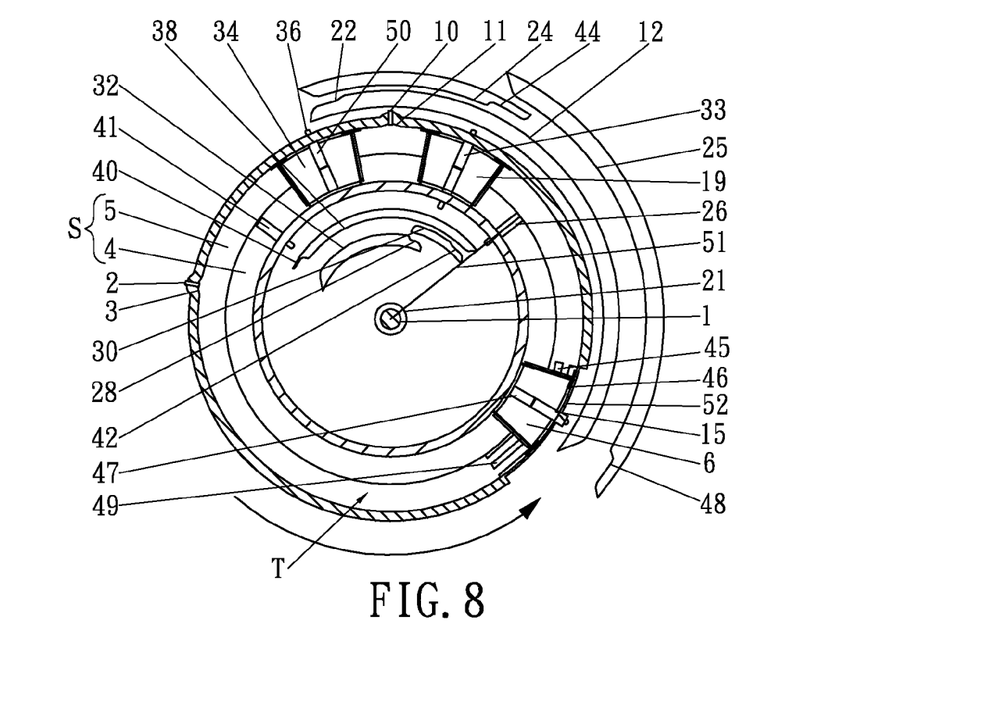
FIG. 8 is a sectional view schematically showing the accomplishment of the air charging compression progress of the present invention.
Figure 9:
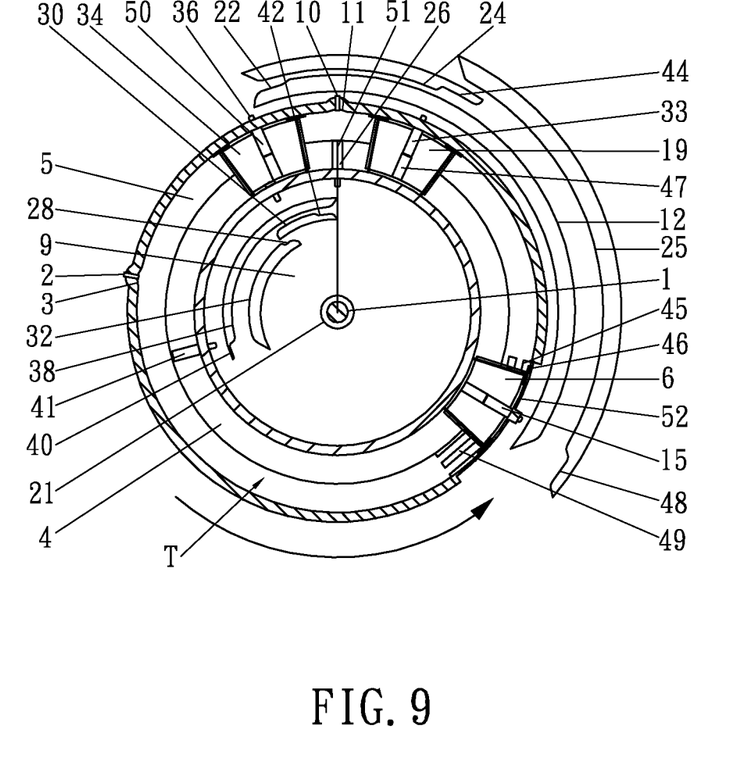
FIG. 9 is a sectional view schematically showing a no load progress of the movable cylinder of the present invention.

Referring to FIGS. 8 and 9, the rotary internal combustion engine keeps on running with the aid of the inertia of the movable cylinder 4 and the auxiliary wheel 9. When the working movable clamp 26 on the movable cylinder 4 moves to piston C 34, the push rod 36 of the working movable clamp 26 falls into the beforehand falling arc plate 22 of working movable clamp. The rotary internal combustion engine keeps on running in the no load progress of the movable cylinder. When the working movable clamp 26 moves to the piston claw clamp slot 47 of piston C 34, under the control of the arc plate 38 of working fixed clamp of the auxiliary wheel 9, the push rod 36 of the working fixed clamp 50 on the stationary cylinder 5 will pull the working fixed clamp 50, whereby the working fixed clamp 50 releases piston C 34 to withdraw into the wall of the stationary cylinder. Under the control of the arc plate 12 of working movable clamp on the arc plate seat 7 of the movable cylinder (as shown in FIG. 1), the push rod 36 of the working movable clamp 26 on the movable cylinder 4 will push the working movable clamp 26 to extend into the gas cylinder S to clamp piston C 34, such that piston C 34 is converted from the working fixed piston into the working movable piston and that the working exhaustion progress starts. By way of reciprocating cyclically, the rotary internal combustion engine keeps on running with the aid of the inertia of the movable cylinder 4 and the auxiliary wheel 9.

It is to be noted that the push rod 36 of this invention is incapable of directly contacting the arc plate and is desirable to contact the arc plate through a solid block component. The hook as noted above is an embodiment of such a solid block component for the convenience of understanding the acting principle thereof. The illustration as shown in figures that the push rod 36 directly contacts the arc plate and the hook aims only for the convenience of description such that those skilled in the art may understand how to practice.

The rotary internal combustion engine of this invention with the combustion chamber 11, the spray chamber 3, a piston and two pairs of claw clamps taken off may be designed as a revolving rotary compressor. On basis of the rotary compressor, a revolving rotary steamer or a gas extractor is further obtainable.

While the invention herein disclosed has been described by means of specific embodiments, numerous modifications and variations could be made thereto by those skilled in the art without departing from the scope of the invention set forth in the claims.

What is claimed is:
1. A rotary internal combustion engine, comprising:
a shell (13) fixed above on a hydro-cylinder (20);
a rotatable power output shaft provided on said shell (13) through a bearing (21),
a stationary cylinder (5) provided within said shell (13) and fixed on said shell (13), wherein at least a compression fixed clamp (33), an isolation fixed clamp (15) and a working fixed clamp (50) are movably provided on an inner wall of the stationary cylinder 5; a spring cup (31) of compression fixed clamp, a spring cup (16) of isolation fixed clamp and a spring cup (8) of working fixed clamp are respectively provided outside of said stationary cylinder (5) at positions corresponding to said compression fixed clamp (33), said isolation fixed clamp (15) and said working fixed clamp (50), respectively; each of said spring cups (31), (16), (8) is movably provided with a push rod (36); one end of each said push rod (36) is connected to said corresponding fixed clamp (33), (15), (50); said stationary cylinder (5) further includes an intake hose (18), an exhaust hose (17), a combustion chamber (11), a spark plug (10), a spray chamber (3), a spray plug (2), an isolation area (52) and an arc plate seat (7); and an arc plate (12) of working movable clamp, an arc plate (24) of shift piston movable clamp and an arc plate (25) of compression movable clamp are provided on said arc plate seat (7);
a movable cylinder (4) provided within said shell (13) and fixed on said power output shaft (1), wherein said movable cylinder (4) and said stationary cylinder (5) jointly form a gas cylinder (S); an inwardly concave configuration inside said stationary cylinder (5) and an inwardly concave configuration outside said movable cylinder (4) jointly form a circular chamber (T) inside the gas cylinder (S); at least a working movable clamp (26), a shift piston movable clamp (41) and a compression movable clamp (43) are movably provided on an inner wall of said movable cylinder (4); a spring cup (35) of working movable clamp, a spring cup (39) of shift piston movable clamp and a spring cup (37) of compression movable clamp are respectively provided outside of said movable cylinder (4) at positions corresponding to said working movable clamp (26), said shift piston movable clamp (41) and said compression movable clamp (43), and each has a push rod (36) movably provided therein and having one end connected to said corresponding movable clamp (26), (41), (43), the other ends of said push rods (36) of said spring cup (37) of compression movable clamp and said spring cup (39) of shift piston movable clamp respectively contacting said arc plate (25) of compression movable clamp and said arc plate (24) of shift piston movable clamp, and the other end of said push rod (36) of said spring cup (35) of working movable clamp contacting said arc plate (12) of working movable clamp;

at least an auxiliary wheel (9) provided within said shell (13) outside the gas cylinder (S) and fixed on said power output shaft (1), wherein the other end of said push rod (36) corresponding to said working fixed clamp (50) contacts with an arc plate (38) of working fixed clamp provided on said auxiliary wheel (9); the other ends of said push rods (36) corresponding to said compression fixed clamp (33) and said isolation fixed clamp (15) respectively contact with an arc plate (32) of compression fixed clamp and an arc plate (30) of isolation fixed clamp provided on said auxiliary wheel (9); and three pistons (6), (19), (34) rotating inside said circular chamber (T) of said gas cylinder (S) along said rotatable power output shaft (1), and being clamped and released in turn cyclically by said clamps (33), (15), (50), (26), (41), (43) which are controlled by said auxiliary wheel (9) and said corresponding arc plates (30), (32), (38), (12), (24), (25) through said corresponding push rods (36) upon running, respectively, so as to switch working modes sequentially.

2. A rotary internal combustion engine as claimed in claim 1, wherein said isolation area (52) is provided between an intake port (45) communicating with said intake hose (18) and an exhaust port (49) communicating with said exhaust hose (17), the arc length of said isolation area (52) is equal to that of said piston (6), (19), (34) and, when said piston (6), (19), (34) is clamped tightly by said isolation fixed clamp (15) in said isolation area (52), said piston (6), (19), (34) will isolate said intake port (45) from said exhaust port (49), such that said rotary internal combustion engine may smoothly perform air charging and exhausting.

3. A rotary internal combustion engine as claimed in claim 1, wherein a datum line (51) of said movable cylinder (4) lies on a line between a central point of said movable cylinder (4) and a central point of said working movable clamp (26), and a datum line of said auxiliary wheel (9) lies on a line from a central point of said auxiliary wheel (9) to a releasing dead point of said arc plate (38) of working fixed clamp and a releasing dead point of said arc plate (30) of isolation fixed clamp.

4. A rotary internal combustion engine as claimed in claim 1, wherein said arc plate seat (7) is provided at the outside of said stationary cylinder (5) adjacent to a position where said stationary cylinder connects with said movable cylinder (4), and said arc plate (12) of working movable clamp, said arc plate (24) of shift piston movable clamp and said arc plate (25) of compression movable clamp are provided on said arc plate seat (7) at positions above said corresponding push rods (36).

5. A rotary internal combustion engine as claimed in claim 2, wherein said exhaust port (49) on said stationary cylinder (5) is provided between a working section of the circular chamber (T) and said isolation area (52), said exhaust port (49) is maintained at an opened position except when said piston (6), (19), (34) passes by to temporally seal said exhaust port (49); and said intake port (45) on said stationary cylinder is provided between an air charging compression section of the circular chamber (T); and said isolation area (52) is for the gas to be continuously charged therein, but not for the gas to be exhausted.

* * * * *